Nov. 23, 1926.  
C. FIELD  
1,608,481  
METHOD OF AND APPARATUS FOR CUTTING METAL  
Filed August 23, 1925     8 Sheets-Sheet 1
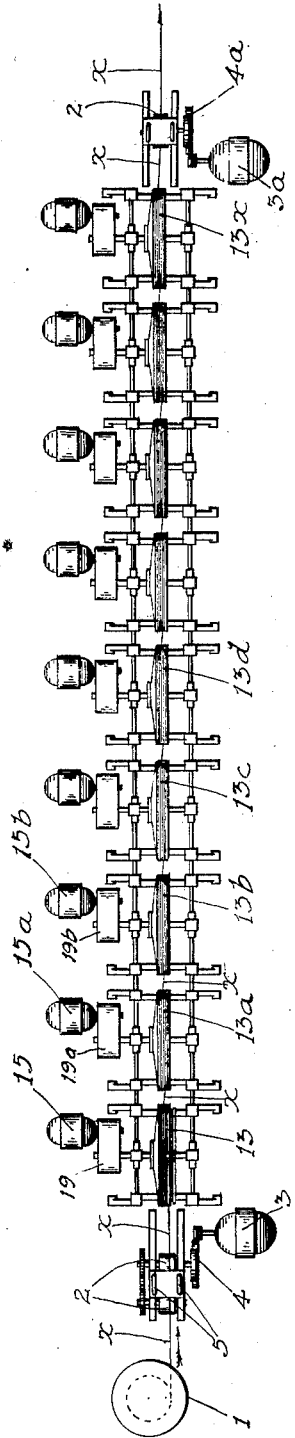
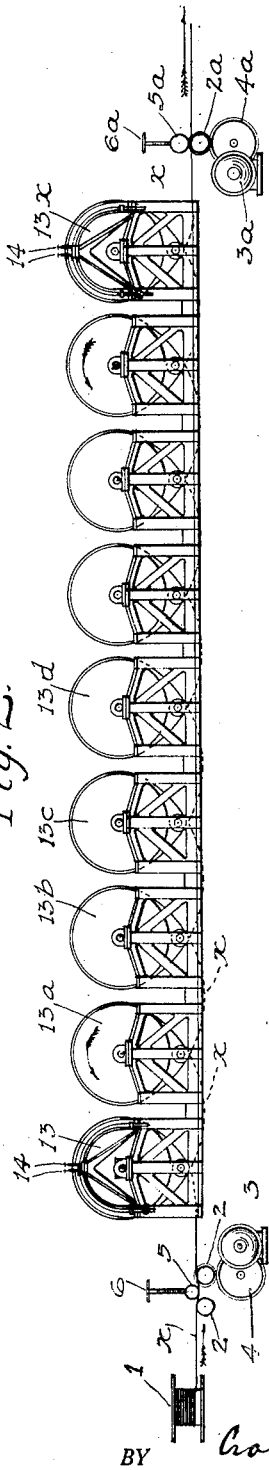
INVENTOR.
BY Crosby Field
George C Dean ATTORNEY.

Nov. 23, 1926. 1,608,481
C. FIELD
METHOD OF AND APPARATUS FOR CUTTING METAL
Filed August 28 1925  8 Sheets-Sheet 2
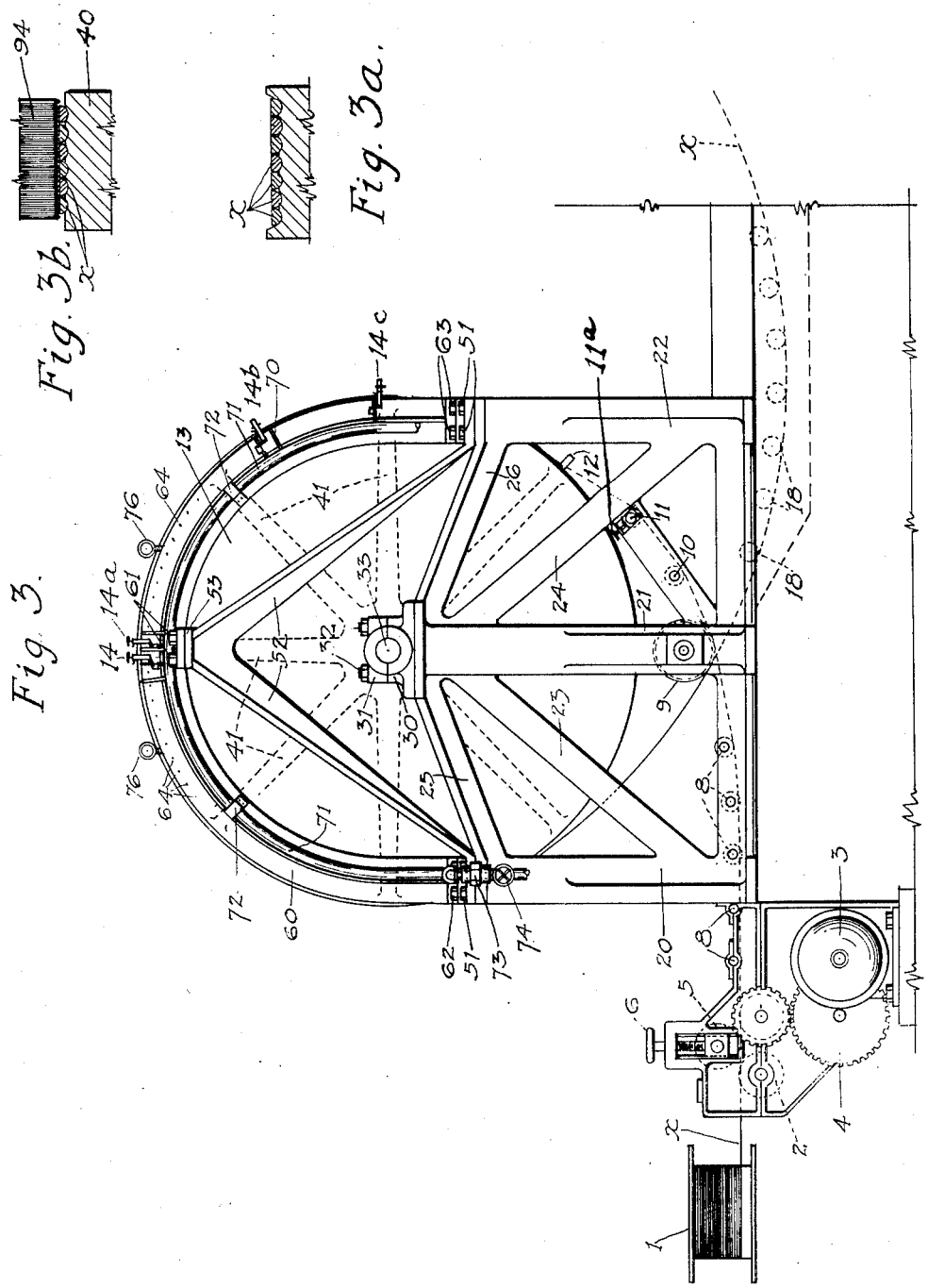
INVENTOR.
Crosby Field
BY
George C. Dean ATTORNEY

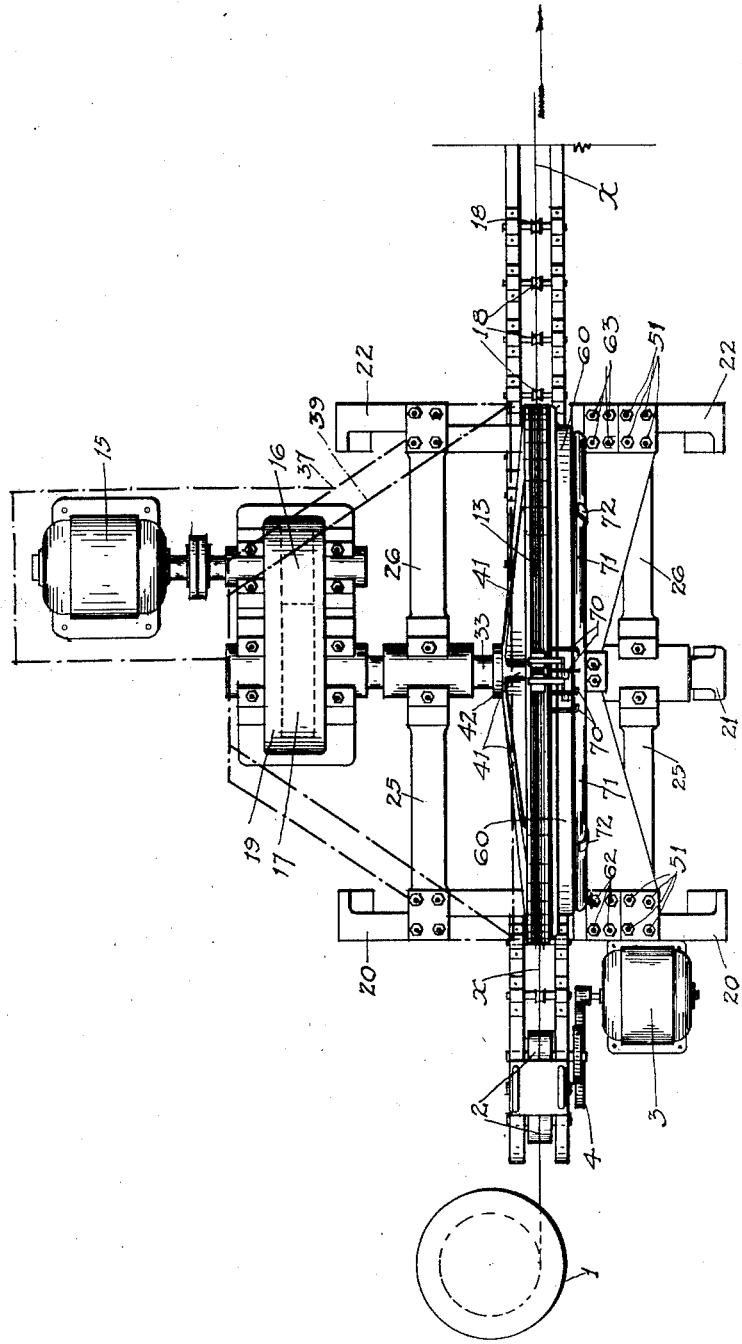

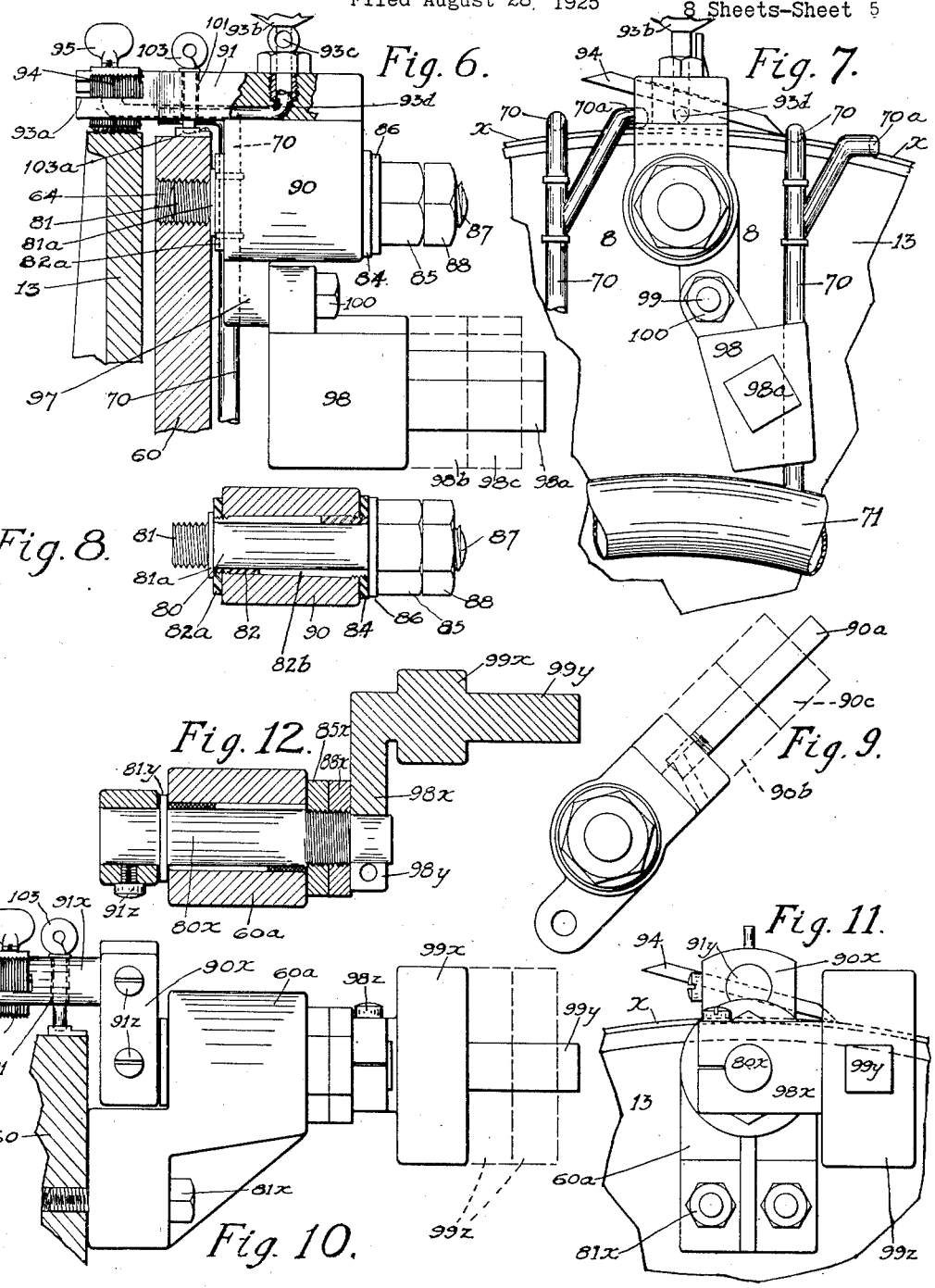

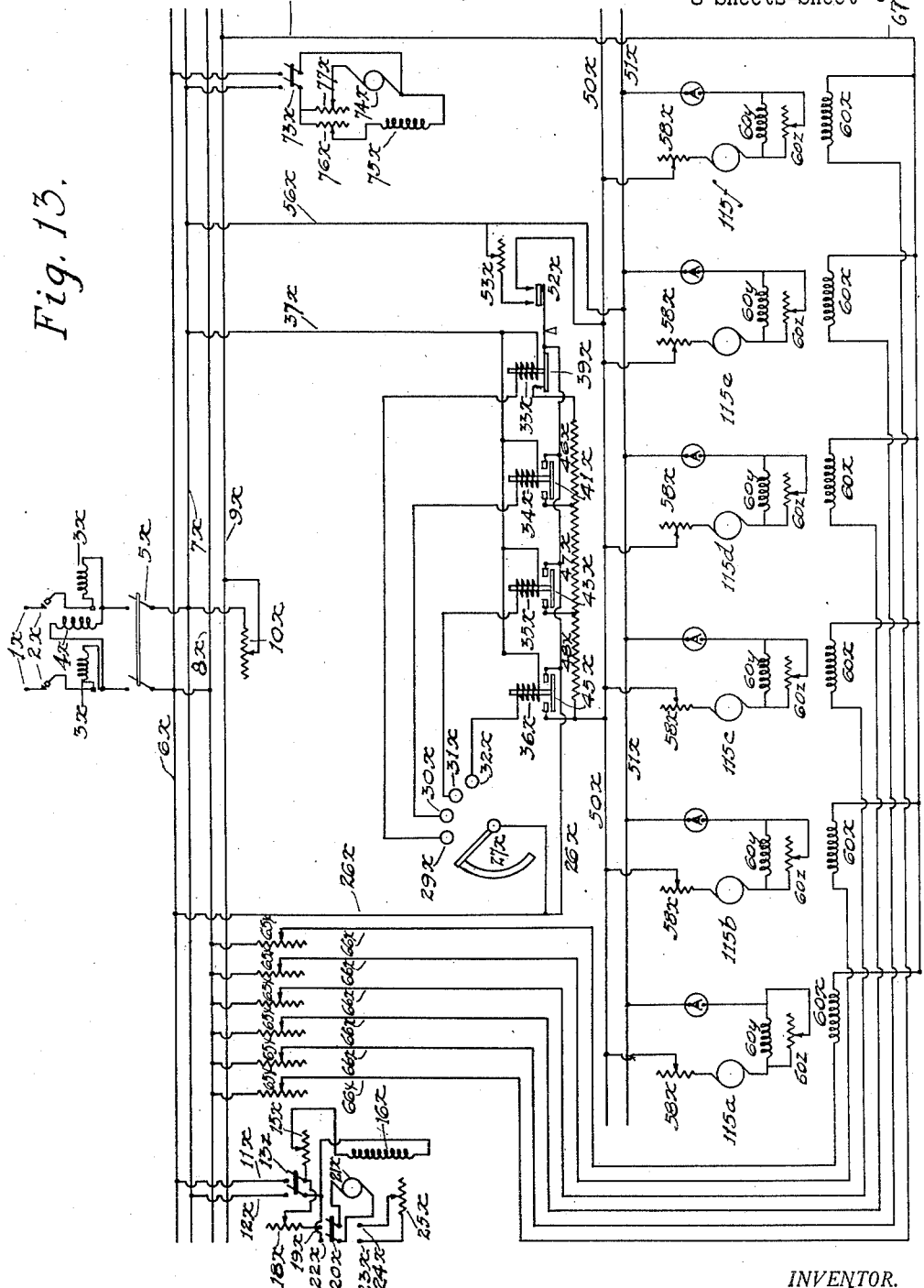

Nov. 23, 1926. 1,608,481
C. FIELD
METHOD OF AND APPARATUS FOR CUTTING METAL
Filed August 28, 1925  8 Sheets-Sheet 7

INVENTOR.
Crosby Field
BY
George C. Dean ATTORNEY

Nov. 23, 1926. 1,608,481
C. FIELD
METHOD OF AND APPARATUS FOR CUTTING METAL
Filed August 28 1925 8 Sheets-Sheet 6

INVENTOR.
Crosby Field
BY
George C. Dean ATTORNEY

Patented Nov. 23, 1926.

1,608,481

UNITED STATES PATENT OFFICE.

CROSBY FIELD, OF BROOKLYN, NEW YORK.

METHOD OF AND APPARATUS FOR CUTTING METAL.

Application filed August 28, 1925. Serial No. 53,011.

My present invention embodies many of the broadly new combinations as well as the special novel features set forth in my application, Ser. No. 688,660, filed January 26, 1924. It relates to a machine for grooving metal, such as steel, copper, aluminum, etc., in such manner that the metal cut from the groove constitutes tough, elastic, long-staple filaments or fibers, of minute but relatively uniform section and preferably presenting sharp edges. Many of the novel features of my invention involve specific adaptations for this specific purpose. It will be found, however, that certain features of the invention are applicable for cutting operations other than grooving, or for operating on other metals or for purposes other than producing the specific product above described.

The specific material which I prefer to employ is steel wire or rod material of circular cross-section such as is commonly supplied in bundle coils. Many features, even very specific features of the method are applicable to steel or other material in other forms, as, for instance, wires and rods or bands of metal that are triangular, rectangular, polygonal or other desired cross-section; and some of the features would be applicable to bars, plates or blocks that are not bendable.

For the preferred use and for producing the preferred fibrous or woolly material from cylindrical drawn wire or rods of bendable diameter, the invention involves close cooperative relation of many novel features and purposes.

In the present commercial art the machines most generally used for the above purposes consist essentially of a stationary bed, over which a wire is drawn by a power driven tractor reel or drum at one end, from a supply reel or drum at the other end. As the wire is dragged over the bed, it is guided and supported by tracks or grooves formed in the latter. A series of knives or cutters are arranged tandem along the bed, being accurately adjustable and rigidly clamped with respect to the latter.

In place of a stationary bed requiring great tension on the wire to overcome friction on the bed, I employ a rotating power driven tractor wheel or drum, which relieves the wire of most of its tension, the bed friction becoming available for applying traction to the wire. In this arrangement, the surface of the tractor drum opposite each knife can afford all or a large part of the traction necessary to feed the wire against the cutting resistance of each said knife. Consequently, the number of knives that can be used in a tandem series all working successively on the same wire, can be increased to any desired extent without danger of rupturing the wire because there is no corresponding increase of end traction thereon.

The traction of the winding reel is reduced to that required to keep the wire in close frictional engagement with the tractor wheel bed and this is preferably regulated by an automatic constant tension drive. This may be through a friction clutch or a slipping belt or preferably by having electric motors driving the wheel bed and also the traction reel, with an electrical control system as hereafter described.

With a single large tractor bed wheel, say five feet to nine feet in diameter, twenty to sixty knives can be used; and in such case it becomes practical to have one direction operation by the use of supply and traction reels which are shifted from winding to supply positions after each pass. An important feature is multiplying the knives to an extent where a single pass of the wire will serve to shave off the wire down to breaking thinness and this may be four-fifths to nine-tenths or even more, of the total diameter of the wire. As a single wheel large enough for this purpose might prove cumbersome and expensive, I prefer a plurality of tractor wheel beds arranged in series. In a special case there may be, say, ten tractor wheels each eight or nine feet in diameter, having forty or fifty knives on each so that the wire may be used up in a single pass without the necessity for any reversing.

By using tractor wheel beds of such large diameter, very much heavier wire or rod material may be used, the apparent practical limit being the largest diameter that can be easily bent to follow the curvature of the tractor bed wheel and in the case of a nine-foot or even a five-foot wheel, quite heavy rod material could be used.

In this arrangement the tractor reel at the far end of the machine has to supply traction only sufficient to take up the slack, keep the wire in firm engagement with the tractor bed wheel, and equalize the rates of travel of all wheels in the series by automatically assisting those that tend to lag behind the others. Moreover, each wheel backward from the traction reel, operates in the same way as a tractor for any lagging wheel in the rear thereof.

My present novel method involves the discovery that in my prior machine it is difficult to prevent the wire from acquiring a twist so that it will not wind true and will not automatically present its flat surface in true parallelism with the cutting edges of subsequent knives. I have discovered that this is due to reversely bending the wire around the guide rolls. This difficulty can be taken care of in various ways, but an important feature of my invention is the discovery that the cause of the difficulty is the reverse bending and that its cause can be removed by always keeping the wire curved in one direction between successive wheels and reels as well as between successive passes around the same wheel. If the initial set given the wire is on a curve of relatively large radius, the elasticity of the wire will permit it to spring to considerably flatter or sharper curvature without changing its "set" and even the set may be considerably changed without any tendency to twist, provided there is no reverse bending.

The self adjusting non-twist behavior of the wire, which I achieve in this way, may be utilized in a tandem machine, where the wire passes only once under the knives of each wheel bed, as in my prior application; but the same discovery has much more important application in my present machine, because it enables me to carry a single wire four to eight times around the periphery of each wheel bed, thus causing it to pass four to eight times under the same set of knives. Consequently, the number of tandem units required to reduce the wire at a single pass may be one-quarter to one-eighth the number required in the prior machine for a given grade or fineness for the metal wool. In practice, this means that with a relatively small number of tandem units operated according to my present invention, it becomes possible to utilize the wire to the best advantage according to the established practice, which recognizes that a certain depth of the cut should be for the production of the coarser grades of metal wool, while certain other parts of the cross-section are adapted for cutting the finer grades, down to what is known as .000. In actual practice, it is a great advantage to be able to reduce the wire at a single pass in a tandem machine, or by very few passes in a single unit machine and yet be free to make the fine cuts requiring many knives, or the coarse cuts requiring fewer knives, according as the market demand may require.

An important discovery with reference to the above described multiple pass of the wire around each wheel bed is, that by making the successive parallel bed grooves on the periphery of the wheel of progressively less depth, the cut surfaces may be kept "level", that is to say, adjacent turns will have their cut faces substantially in the surface of a single cylinder and consequently can be cut simultaneously by a single wide blade cutter. With the floating cutters hereafter referred to, the multiplicity of parallel surfaces gives each knife a wide bearing on the work and inequalities in the hardness of the wire are averaged up so that tendency to chattering is minimized; that is to say, if there are six parallel surfaces being cut by one knife edge, the pressure of the knife may be adjusted to the aggregate for the six surfaces and any specially hard or soft spots in one turn of the wire that comes under the knife will be averaged out with five other points on the wire. On a 9 foot wheel these points will be, say, 27 to 30 feet apart so that the knife is gaged by the average condition of, say, 250 feet of wire.

Another important feature is cutting the peripheral bed grooves so that the maximum diameters of the wires will be nearly or quite touching each other. This has various advantages and is of particular importance in connection with use of a transverse air blast for removal of the cut fiber, since it blocks the tendency of the steel wool to curl down into the space between the wires where it would be out of reach of the blast. In practice the wire is not shaved thin enough to open up very wide gaps between the turns, and the gaps get shallow faster than they widen.

In my present machine, I prefer to utilize the discovery set forth in my prior application with reference to grooving of a wire by means of a knife edge having a multiplicity of very minute V-shaped serrations, to produce relatively uniform, long staple fibers of triangular cross-section and very fine gage, that is, near or above 1/1000 of an inch in thickness and up to, say, 1/32 of an inch or more, the most generally useful gage being 2/1000 to 4/1000 inch. Heretofore long staple and uniform cross-section for the fiber has been supposed to depend upon accurate rigidity of the machining operation. Practically all the commercial product is now produced by clamping with utmost rigidity and gaging with utmost accuracy the desired adjusted position of the knife with respect to the bed which is engaged by the under surface of the wire.

Another but less practical method is to do the same rigid clamping and accurate gaging with reference to a presser foot or roller that engages the top surface of the wire, just in advance of the knife. In the latter case the knife is just as rigidly related to the wire engaging presser foot, as it is to the bed, in the first case.

I have discovered, however, that serrated knives of this kind do not have to be adjusted or clamped in fixed relation to any gage element, either bed or presser foot. They can be "floating", that is, pivoted or otherwise movably supported so that they are left to make cuts of any depth whatever, yet they automatically gage their own operation for a desired depth, less than the depth of the serrations. Moreover, the gaging of the depth of the cut and resulting thickness of the product, can be more accurate than when the knife is clamped to any gage, whether presser foot or bed of the machine. For instance, V-shaped serrations approximately 5/1000 of an inch in depth can be made to automatically gage their own operation in cutting fibers of any desired size between 2/1000 and 4/1000 inch, the precise gage being determined by the weight or pressure applied to force the knife into the work. This is the more remarkable because geometrically considered, the knife is somewhat like a chisel with the bevel side away from the work and one would expect it to automatically dig into the wire either progressively so as to cut it off intermittently so as to chatter.

I have discovered that the desired smooth, accurate operation by my "floating" or self gaging method, can be obtained with knives quite similar to those previously used as regards form and angle of bevel, provided movement of the knife is steadied by properly disposed inertia masses, preferably masses disposed in rigid relation to the knife clamping point, in combination with means affording frictional damping of pivotal movements whereby the knife can change its depth of cut in the work. With proper arrangement of these essentials, the depth of the cut can be gaged by adjusted constant pressure.

By suitable use of inertia and frictional damping as above described, vibratory movements are practically eliminated from the knife, but it is also important that the support for the wire which is being cut should also be free from vibration. Also irregularities of the bed, even slight ones, should be avoided because fractions of a thousandth may be important for the finer gage product, or where the conditions are such as tend to make cumulative, any incipient irregularities in the cut surface of the wire upon which the knives operate.

For these and other reasons, it is highly desirable to have the wheel rotate in a vertical plane so that there will be no sag of the edge thereof. Also it should be of cast metal, carefully designed because as is well known, ordinary machined castings are liable to change shape and contour for long periods, sometimes one or two years after they are machined. Hence I prefer a disc having one face plane and the other face inclined so that the disc tapers slightly from the hub to the periphery; and to reinforce with deep radial webs also tapering toward the periphery. Accuracy practically forbids the ordinary keyed mounting on a cylindrical support shaft, and I use a drive fit of the hub upon a fine-taper, coned shaft.

For heavy loads such as are imposed where a 9 foot wheel bed is used with 50 or 60 knives operating simultaneously on four to eight turns of the wire, I find it desirable to drive the wheel from the electric motor through a herringbone peripheral gear, these being available in such perfection that the required high power may be transmitted without causing substantial vibration of the wheel. I may also use or omit the vibration insulating coupling employed in connection with the worm gear in the apparatus of my prior application.

I find that I am able to entirely dispense with the gravity equalizing rollers between units which are employed in my former application and to have a traction throughout the machine which is through a substantially fixed length pass, the only mechanical equalizing being from a slight elastic straightening of the curvature of the wire between the rigid support points. This is minimized by one-direction curvature of the wire with no points of sharp flexing and the take-up is essentially a function of the electric motor system.

My continuous one-direction curvature method could be applied to the machine of my former application without change in that machine, merely by threading the wire first under, then back over, then under the discs and the floating take-up pulleys, in a succession of large and small loops of one-direction curvature.

The peculiarities of my automatically self gaging, or floating, knives makes it simple to arrange for raising or lowering each knife into or out of operation either individually or simultaneously. Moreover, no accurate adjustment with respect to the tractor wheel being required, all the knives of one wheel may be mounted upon a single support so that they may be all removed as a unit and the same or similar unit then applied in operative position without the necessity of any adjustment whatever for the individual knives. Obviously this non-adjusting replacement feature of the invention is applicable where the rotating wheel bed is not power driven and even where the bed is stationary, as in the present-day machine described above.

As in my prior application, I may remove the cut fibers from the cutting edge of the knife as fast as they are cut, preferably by a properly directed air blast. Such a blast may be directed so as to have an important cooling effect on the working edge of the knife. By properly regulating the force of this blast, it will operate non-positively on the filaments to gently draw them away from the cutter as fast as they are grooved out of the wire, thus preserving the product in the longest possible strands or filaments and depositing them in a loose fluffy mass facilitating subsequent handling, grading and packing of the product.

According to present practice, the material most used is wire of .106 inch diameter, obtainable in the market in bundle coil form, the lengths in the coils being quite variable, between, say, 3,000 feet and 9,000 feet, the more common length being around 7,000 feet. While wire of the same diameter or greater diameter may be found in all forms of my machine, the size of the wire is determined partly by the practical limit of tractor wheel units that may be desirably employed in tandem or interdependent relation.

In all forms of the machine and particularly in the tandem arrangement, the supply of the wire to the machine is kept continuous by electrically welding the end of a second coil to the tail end of the preceding one. In this way the effective length of the wire available is unlimited and, barring accidents, the tandem machine may be run for almost any length of time without necessity of rethreading the wire through the machine.

The above and other features of my invention may be more fully understood from the following description in connection with the accompanying drawings, in which—

Figs. 1 and 2 are respectively plan and side elevation of a multiple unit machine;

Figs. 3, 4 and 5 are respectively side elevation, top plan view, and end elevation of one of the similar units of the machine shown in Figs. 1 and 2, the first unit being selected to show also the feeding-in mechanism;

Figure 14:
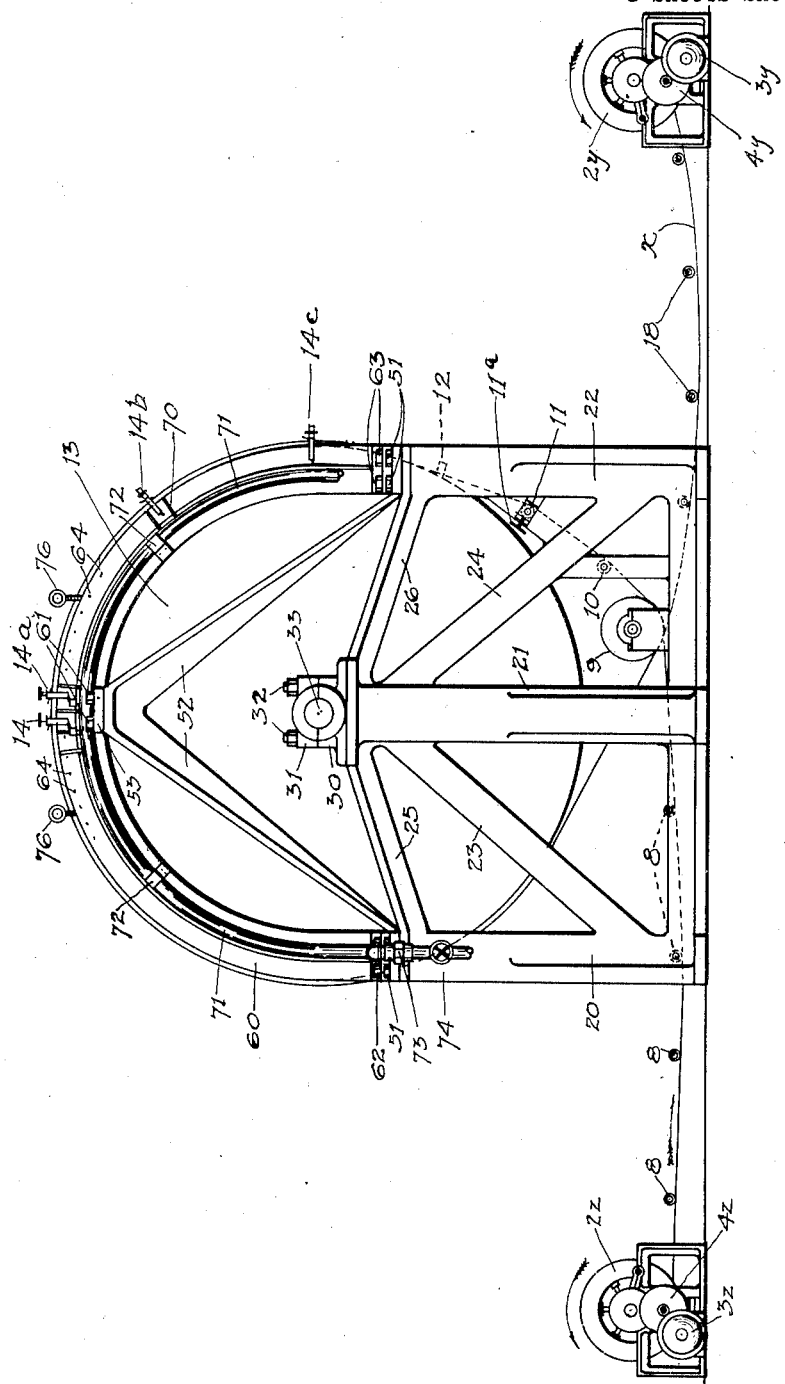
Figure 15:
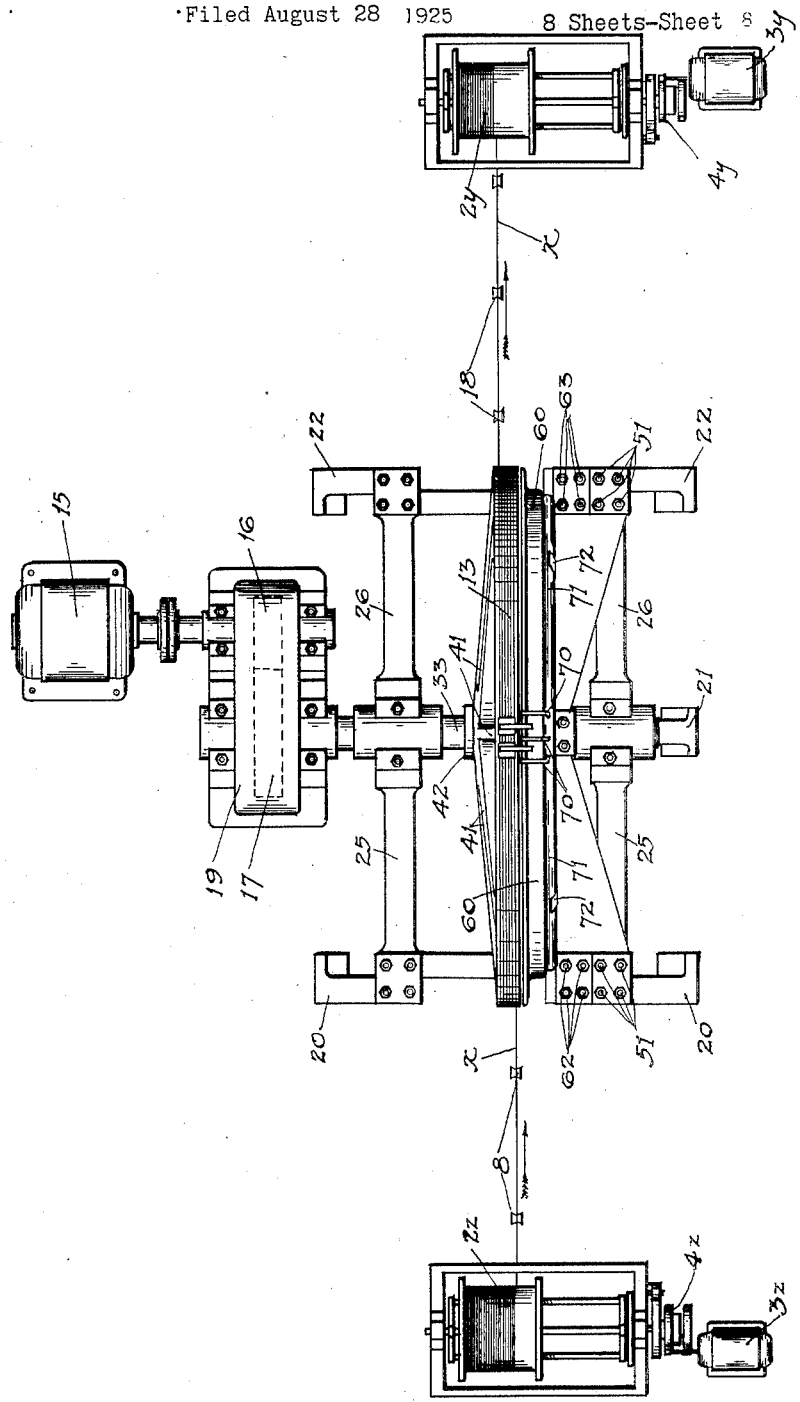

Fig. 3ª is a sectional detail of a guide roller shown in Fig. 3, in a radial plane passing through the axis of the guide roller and transversely through wires guided thereby;

Fig. 3ᵇ is a detail section radially through a portion of the periphery of the rotating wheel bed showing a portion of one of the knife blades in cutting relation to the wire;

Fig. 6 is a detail section radially of the traction wheel and tool support showing a tool holder partly in elevation and partly in section;

Fig. 7 is a side elevation of the parts shown in Fig. 6;

Fig. 8 is a section on the line 8—8, Fig. 7;

Fig. 9 is a side elevation showing modification;

Figs. 10, 11 and 12 are views respectively like Figs. 6, 7 and 8, but showing a modification;

Fig. 13 is a wiring diagram showing a system of motor control for the multiple unit machine; and Figs. 14 and 15 are respectively side elevations and plan of a single unit machine.

The assembly shown in Figs. 1 and 2 comprises an organization of similar units in a single machine adapted to reduce the wire to the scrapping point in one pass through the machine and this result depends upon the novel features of the units (see Figs. 3, 4 and 5) whereby the knives may be sufficiently multiplied to make this result possible. There is a supply reel 1, which may be of conventional construction, adapted to hold a bundle coil of the wire, rotatably supported and subject to drag imposed by friction in any of the usual ways, so that upon application of end traction a continuous orderly supply of wire may be drawn off. The wire $x$, from the reel is drawn through straightening rolls comprising two fixed rolls, 2, 2, geared together and to a motor 3 through reducing gear 4. Between them and on the opposite side of the wire is the roll 5 which is vertically adjustable by means of screw 6. Rolls 2, 2, each have a peripheral groove, preferably semi-circular and of proper size to fit the wire, while roll 5 preferably has a cylindrical surface.

From the straightening rolls, the wire $x$ passes under a series of guide rolls 8, each of which has a single groove fitting the wire. These rolls are arranged so as to guide the wire in a single plane and in a single-direction curve to the guide roller 9, the periphery of which is formed with a multiplicity of grooves as indicated in Fig. 3ª, in one of which the wire is guided with further curvature in the same direction, and whence it passes on under grooved rolls 10 and 11 which are so located that the wire maintains the same plane and direction of curvature imposed by rollers 8 and 9. Thence it passes through lateral guides 12 to the first groove in the first tractor shaving wheel 13.

The rolls 8, 10 and 11 may be 1½ inch to 2 inches in diameter against 10 inches for roll 9, so that 8 and 10 may tend to "set" the wire somewhat, because of their small diameters and roll 9 because of the large angle of deflection. In any event, the last roller 11 is adjustable as by screw 11ª and its diameter as also the sharpness of the angle of approach and departure of the wire are carefully predetermined with a view to giving the wire a final "set" in a true circle of radius approximating or somewhat smaller than the radius of the tractor bed wheel 13, so that the spring of the wire will tend to cause it to hug the periphery of the wheel.

In the first groove in the first tractor wheel, the wire is dragged under a series of gravity pressure shaving knives 14, 14ª, etc., which may be 40 to 60 in number, arranged around the upper portion of the traction wheel 13; thence the wire passes again under the roller 9 in a second groove and thence under a second pair of grooved pulleys 10 and 11 and guides 12 to the second groove in the traction wheel 13. In similar repeating cycles, the wire passes to successive grooves in the pulley 9, and successive sets of rolls 10, 11, and guides 12 to successive bed grooves in the periphery of the tractor wheel 13. In the example shown in Fig. 3ᵇ, the wire thus encircles the wheel six times and six parallel turns are simultaneously acted upon by each knife 14. From the final bed groove in 13, the wire passes under a seventh groove in guide roll 9 and thence under a set of curvature maintaining guide rolls 18 arranged along an arc of large, single-direction curvature, leading under the main, multiple-groove roll 9, of the second unit 13ª. The second unit is identical with the first, except that all the bed grooves in successive units are several thousandths of an inch shallower to compensate for the reduced thickness of the wire. After encircling this unit a desired number of times, say six, the wire is led out under the second set of guide rolls 18 to the third main guide roll 9 of the third unit; and so on to the end of the series.

In the form shown in Fig. 3, the knives extend around the upper semi-circumference of the tractor wheel 13, the wire entering the bed groove a substantial arc in advance of the first knife and leaving it a substantial arc after the last knife. The knives act to substantially flatten the curvature of the wire, so that it is not really necessary to have any guide rolls in the stretch between the last knife and roll 9. Hence also follows the desirability of resetting the wire to the curvature of the wheel 13, by means of the rolls 9, 10, and 11, after every pass under the knives. This condition of flattened, or minimum curvature is taken advantage of to facilitate flat curve passage of the wire from one unit to the next without substantial change of its set until after it reaches said next unit.

From the final unit 13ˣ, the wire passes through traction rolls, preferably comprising an adjustable upper idling roller 5ª adjustable by means of screw 6ª and in cooperative relation to the lower roller 2ª driven through reducing gear 4ª by motor 3ª.

As will be explained hereafter in connection with the wiring diagram, the motors 3 and 3ª are shunt wound and have an external resistance in the armature circuit. By means of a control rheostat, these armature resistances may be varied when the motor is running as a motor in which case it has a drooping characteristic, or where the wire may be pulled by the rest of the machine through the rolls 2, 5, the shunt wound motor has its field separately excited from an external source and controlled by means of an external field rheostat so that it acts as a generator, thus providing a delicately controlled dynamic brake upon the travel of the wire.

The tractor wheels 13, 13ª, etc., are driven respectively by motors 15, 15ª, etc., through pinions 16, 16ª, etc., meshing with gears 17, 17ª, etc., in gear boxes 19, 19ª, etc.

Figure 5:
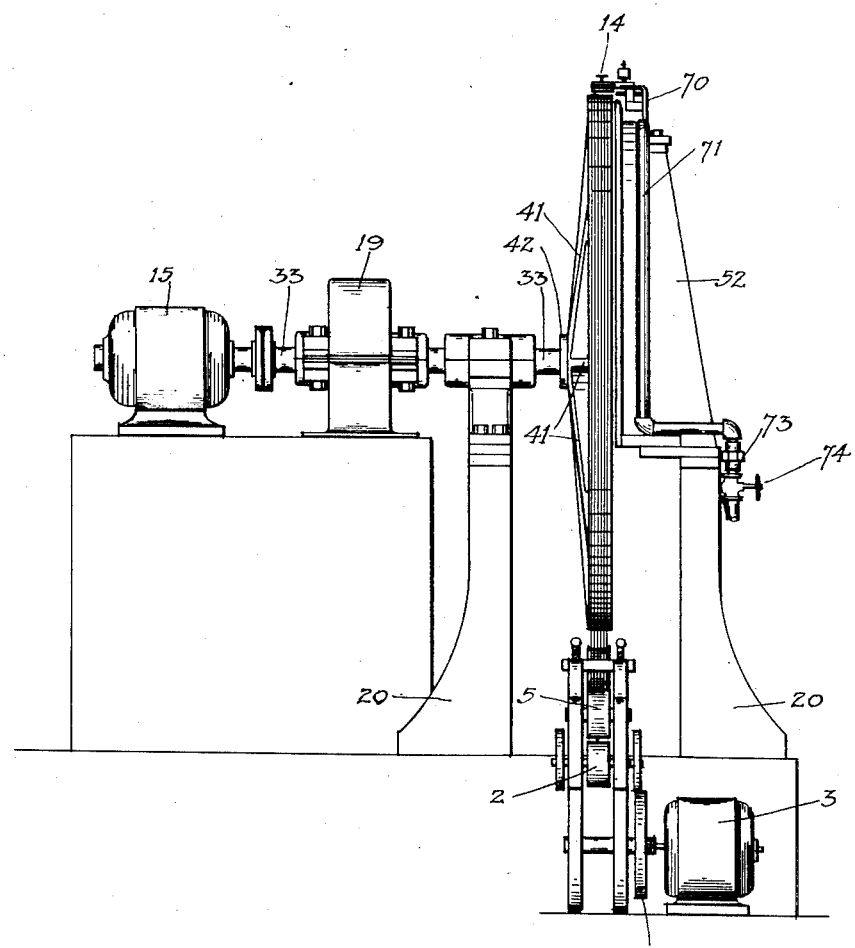

In the form shown in Figs. 3, 4 and 5, each wheel unit comprises a well braced frame, comprising standards 20, 21 and 22, horizontally connected through longitudinal members 23, 24, 25 and 26. The standard 21 carries a journal box comprising two sections 30, 31, secured by bolts 32, 32 and serving as a mounting for shaft 33. Shaft 33 carries the tractor wheel, in this case shown as comprising a heavy cast iron disc 13, plane on the front face and strengthened against warping by radial webs 41, 41, projecting from hub 42, as and for the reasons explained in my said prior application.

Secured on the top of standards 20, 22 by bolts 51, 51, is a V braced member 52, 52, having at the upper end a seat 53, for anchoring a semi-circular cutter support 60, which is detachably secured to it by bolts 61 at the top, 62, 62, at one end and 63, 63 at the other end.

This semi-circular support is located close to the periphery of wheel 13 and is formed with a multiplicity of spaced holes 64 for securing a large number of cutting tools in operative relation to the wire on the periphery of the wheel 13. Cutters and cutter holders are diagrammatically indicated at a few points around the periphery as at 14, 14ª, 14ᵇ, 14ᶜ, etc.

As may be seen from Figs. 4 and 5, the shaft 33 is supported at its other end by a frame work and journal box similar to that described in connection with Fig. 3. Outside of this journal box, in the gear box 19 the shaft is provided with a large herringbone gear 17, driven through a pinion 16 by electric motor 15.

As indicated in dotted lines in Fig. 4, the backside of the wheel 13 may be closed in by a rearwardly extending shield 37, 39, that is preferably circular in cross section with one edge brought close up to and registering with the periphery of the wheel 13, to receive and guide rearwardly and laterally downward the steel fiber or wool as it is removed from the knives.

The means for removing the fiber includes a series of air jets, discharged through pipes 70, which are connected with a semi-circular supply pipe 71, through which the air is forced from a suitable source, preferably a pressure blower, not shown. The force of the blast may vary with the position of the nozzles and in general will be less powerful for the finer gages of steel wool. For instance, for very fine fiber, a nozzle pressure of about 3 lbs. will be suitable for effectively removing the strands as they curl up from the knife, while yet gently enough to stream them across over the hood in the longest possible lengths. For coarser fiber, a nozzle pressure of 6 lbs. or more may be desirable.

The supply pipe 71 is detachably held intermediate its length by clips 72, and at the supply end there is a readily detachable screw coupling 73, which will be disconnected when the supply valve 74 has been turned off.

The knives 14, 14$^a$, 14$^b$, etc., being automatically self adjusting in their relation to the wire, the entire bank of knives can be applied or removed as a unit. In order to remove one set and replace another, it is only necessary to detach the air supply pipe 71, which carries the nozzles 70; then unscrew bolts 62, 63 and then lift the semi-circular support 60 out of position. This may be effected by any suitable means, as for instance, a hoist carried by an overhead trolley, not shown; the eyes 76, 76 being provided for engagement by lifting hooks. A substitute unit can be replaced by reversing the above described steps, the knives automatically accommodating themselves to the work when the support 60 is secured in proper position.

Various knife holders whereby the knives or blades may be automatically self-accommodating to the work, are shown in Figs. 6 to 10. Each hole 64 in the knife support 60 has a stud shaft 80 secured thereto by screw shank 81, which may be of steel. Preferably, there is an integral collar 81$^a$ adapted to be screwed tight against the face of 60 affording a gage and lock surface for accurate positioning of the stud. The stud 80 is of large diameter, has considerable length so as to give ample bearing surface as well as to avoid vibration or lost motion.

The body portion 90 of the knife holder is mounted on this stud, but with an interposed bushing 82, preferably of brass, which is split alternately from each end as at 82$^b$. This bushing is tightened down upon the stud 80 by screwing up the ring 82$^a$ to draw the bushing into the taper recess 83 in the tool holder. Preferably there is a similar screw ring 84 on the other end of the bushing.

This applies a predetermined friction for damping rotary movement of the holder 90 about the stud 80. The tool holder is held from working endwise and an additional amount of friction afforded by washer 86 held tight against 84 by nut 85 and lock nut 88 on the screw threaded end 87 of the stud 80. The tool holding arm 91 is rigidly secured to 90 by screws or other suitable means not shown. Its free end is slotted for lateral insertion of the cutting blade 94, which is secured in position by clamping screw 95, the usual V-groove on the surface of the knife being downward against the lower seat 93$^a$. Through this seat a fountain oil supply is applied to said grooves and flows downward therein to the cutting edge. A simple arrangement for this purpose consists of an oil cup 93$^b$ which may be of ordinary construction, controlled by a valve 93$^c$ and mounted on the top of a knife carrying arm 91. A convenient way for leading the oil from this cup to seat 93$^a$ is to slot the under surface of 91 and drill a downward passage intersecting the slot. This forms a conduit through which an ordinary flexible copper pipe 93$^d$ may be led from the outlet of oil cup 93$^b$ to the knife bed 93$^a$ in the clamp. It will be noted that the body portion 90 of the tool holder is very massive and that the tool carrying arm 91 is also massive although, toward the end, it is reduced to a somewhat lighter though still heavy section.

The part 90 has a downward extending lug or ear 97 carrying the weight 98, which is out of line with the perpendicular plane passing through the axis of 80 so that the cutting edge of the knife is yieldingly pressed forward and downward. As the amount of this pressure should be predetermined for particular cases and as the angular relation of the weight to produce a given pressure depends on the angular position of the knife around the semi-circle of support 60, the weight arm is hinged on pivot screw 99 and held by nut 100, which may be loosened or tightened to secure the weight in any desired position of angular adjustment.

The knife-holder is preferably provided with a hole 101 and the periphery of the knife carrier with a lug 103$^a$ so that when the knife-holder is swung backward out of operative position, a pin 103 will be cammed upwards and drop behind the lug to hold the knife in the inoperative position as long as desired.

As shown, the wheel 13 is of such great diameter that its curvature is negligible so far as concerns the operation of the knife 94 on the wire and as shown in Fig. 3, the pressure of knives operating at the vertical points in the wheel as 14, 14$^a$, may have the effective pressures on the knives adjusted by pivoting the weights 98 to any desired position with respect to the pull of gravity.

A further adjustment for inertia effect as well as gravity effect is afforded by providing the weight arm 98 with a stud 98ª parallel with the axis of journal stud 80, on which may be placed added weights as 98ᵇ, 98ᶜ.

With a knife having a cutting edge with, say, 190 V-serrations per inch, having a 36 degree bevel and inclined 14 degrees to the wire, it was found that with proper adjustment of the frictional damping afforded by bushing 82, a weight of 20 pounds to 30 pounds for the tool holder will afford the desired inertia. Desirable downward (radially inward) pressure of the knife edge on the wire, is a function of the cutting thrust and with the tool holders now used, the effective pressure required for a knife edge simultaneously cutting on 5 wires is about double that required for one wire, indicating a 25% increase for each added wire.

Where the desired number of pounds counterbalance of thrust was obtained by a power arm 8 inches long with proportionally less weight, the wool was not as long fiber or as good quality as where the effective power arm was 2¾ inches and the weight was proportionally greater. This illustrates the value of the inertia factor of counterbalance against knife reaction.

It is to be noted that coarser serrations, grooving more deeply into the wire, will afford greater rearward thrust and will require greater weight or greater eccentricity for the weight 98.

In this connection, it is desirable to explain that although geometrical perfection of the V-shaped cutting edge of the knife would seem inevitably to result in a downward wedging component whereby the knife would automatically dig into the wire and cut it off, it is a fact that for the angles mentioned above, there is no digging-in tendency. On the contrary, there is reaction of the moving wire on the knife that yields an upward resultant. This is partly because the thrust on the knife has a very large component perpendicular to the radius of movement about the pivot 80 and any rotation of the knife carrier in this direction tends to carry the edge of the knife upward and away from the wire, as shown in Fig. 7. However, this is not the only upward effect, because I find that it is practicable, though less desirable to locate the axis of pivotal movement in line with the thrust of the knife. In this case also there is an upward component which must be counterbalanced by the eccentric weight to keep the floating knife in operative relation to the wire, and this appears to be derived from upward reaction of the wire on the V-shaped serrations. My theory is that when the knife is beveled back at a 36 degree angle, as indicated in Fig. 7, the steel at the extreme edges of the intersecting planes cannot be a mathematical line and considered from the viewpoint of 1/10,000 inch measurements, is in fact an extremely minute skate or ski point. Whatever may be the theory or the fact, there is this unexpected upward reaction of the wire upon the knife that makes my floating knife possible. The reason the edge automatically gages depth with such great accuracy is that the upward component increases at a very definite ratio to increase of depth of penetration of the V point knife. Consequently, with sufficient inertia backing, and with sufficient friction damping, the gaging is more accurate than can be secured in practice with a perfectly solid bed and a knife as rigid as possible.

The above described knife holders are satisfactorily adjustable, particularly for positions near the top and for all of the downmoving part of the wheel, because even the extreme cases near the horizontal can be taken care of by adding more weights to more than counterbalance the weight of the overhanging parts 90, 91, 92 and 94, but for the up-moving part of the wheel from horizontal to a point 20° or so from the top the weight of said parts is in the direction for pressing the knives into the wire and I prefer to adjust merely by adding to this weight as by providing the cutter holders with a stud 90ª, on which may be held any desired number of removable weights, as 90ᵇ, 90ᶜ, etc. In such case the weight 98 may be entirely removed from the ear 97.

The modified form of tool holder shown in Figs. 10, 11 and 12 has the advantage that it is universally adjustable for all possible positions on the wheel.

In this form there is a bracket, 60ª, secured to the support 60 by two bolts, 81ˣ. The shaft 80ˣ is journaled in this bracket and secured by nuts 85ˣ, 88ˣ, cooperating with the integral collar 81ʸ. The bushing in which this shaft rotates may be split and provided with adjusting means not shown but preferably similar to that shown in Fig. 8. On the lefthand end of this shaft is a radius arm 90ˣ, carrying a tool holder arm 91ˣ. The three parts being rotatably adjustable, are locked in the desired position by means of screws 91ᶻ. On the other end of shaft 80ˣ is a weight arm comprising a heavy radial portion, 98ˣ, split as at 98ʸ and secured by clamping bolt 98ᶻ. This crank arm preferably has a fixed weight 99ˣ and a stud 99ʸ on which may be threaded additional weights, 99ᶻ, indicated in dotted lines. In this arrangement it will be evident that the weight arm can be adjusted around an entire circle of 360° and can be put in any relation whatever required to apply the radially inward pressure of the knife edge on the wire regardless of whether the holder is at the top or at the extreme lefthand or righthand of the horizontal diameter of the traction wheel.

By reference to Fig. 7, it will be seen that there are two air blast nozzles for each knife, these parts being flexible copper tubes that may be directed variously to suit the conditions for individual knives. One of the conditions seems to be having a certain amount of the air impinge on the cutting edge from the rear in order to prevent occasional accumulations of fiber tending to clog the knife. As it is not always easy to arrange a single jet to serve both the front-float function and the rear-clearance function, the second nozzle, as $70^a$, is directed upon an adjacent knife, from the rear, preferably at an angle of from 45 to 60 degrees to the cutting edge of the knife. The composite blast derived from two such nozzles can be adjusted to serve both purposes more perfectly, besides having greater cooling effect on the cutting edge.

Referring again to Figs. 1 to 5, the respective motors will be energized in accordance with the resistances of the respective units driven by each, to the end that normally the speeds of all the traction units will be the same and from the exit end of the machine back to the wire supply at the entrance, each motor should normally tend to apply end traction upon the wire approaching it.

While the adjustment of motor speeds may be effected by individual rheostats controlled by an operator in accordance with the observed tension on the wire, I prefer a control system permitting simultaneous or co-ordinated stopping and starting of the machine, in addition to the individual adjustment of each motor for constant speed which is substantially the same as that of each other motor.

In the system shown in Fig. 13, power is derived through suitable terminals $1^x$, connected to a direct current source. The terminals connect through automatic circuit breaker $2^x$ with the terminals of the double pole hand switch $5^x$. The automatic switch has overload coils $3^x$ and a no voltage coil $4^x$ of well known type.

The hand switch $5^x$ controls application of power to the busses $7^x$, $6^x$; also through an adjustable main field rheostat $10^x$ to the field busses $8^x$, $9^x$, and to armature busses $50^x$, $51^x$. The wire feed rolls at the entrance of the machine, as 2, 2, are mechanically connected to the armature $21^x$, which when operating normally, is run as a generator, being rotated by the pull of the wire and acting as a dynamic brake for applying adjustable drag on the wire operating to tension it. For this operation as a dynamic brake, the double-pole, double-throw knife switch $20^x$ is turned downward, short-circuiting the armature circuit through contacts $23^x$, $24^x$ and adjustable armature resistance $25^x$. The field $16^x$ is energized from busses $7^x$, $6^x$, through leads $11^x$, $12^x$, double-pole switch $13^z$ and adjustable rheostat $15^x$. By adjusting the field resistance $15^x$ and the armature resistance $25^x$, the dynamic braking effect may be adjustably regulated.

In feeding the wire when first passing it through the machine, the armature $21^x$ is run as a motor, switch $20^x$ being thrown upward to engage contacts $19^x$, $22^x$, which are energized through the above described switch $13^z$. The current through the armature is regulated by resistance $18^x$, while the field current is regulated by $15^x$ as before. The tensioning rolls at the exit end of the machine beyond the last cutting unit, as $2^a$, $5^a$, are connected to the armature $74^x$, which is run as a motor controlled by line switch $73^x$, its field $75^x$ being regulated by rheostat $76^x$ and its armature by rheostat $77^x$.

The traction wheels or discs 13, $13^a$, etc., have their motors 15, $15^a$, $15^b$, etc., adapted to be operated either as shunt-wound or compound-wound, depending on the material to be shaved. As shown in the diagram, their respective armatures $115^a$, $115^b$, $115^c$, etc., have compound fields each comprising a winding $60^x$ that is separately energized and a winding $60^y$ that is in series with the armature. The field windings $60^x$ are connected in parallel across busses $8^x$, $9^x$ through a separate circuit $66^x$, $67^x$, separately controlled by an adjustable series resistance $65^x$. Each series winding $60^y$ is controlled by an adjustable shunt resistance $60^z$, while the circuit through which said series winding and armature are serially energized is controlled by adjustable series resistance $58^x$.

These armature circuits are connected in parallel across the busses $50^x$, $51^x$ and normally closing the main switch $5^x$ will energize them through buss $6^x$, wire $26^x$ resistances $46^x$, $47^x$, $48^x$, through the parallel armature circuits to buss $51^x$ and thence through wire $56^x$ to buss $7^x$.

By reason of this arrangement, the motors have a drooping characteristic so that they tend to be automatically self accommodating to variations of load or power in adjacent wheels 13, $13^a$, etc., as transmitted through the wire $x$ whereby all the wheels and their motors are mechanically interlinked.

A small drum controller $27^x$ is arranged to pass successively over switch points $29^x$, $30^x$, $31^x$ and $32^x$, to operate contactor coils $33^x$, $34^x$, $35^x$ and $36^x$, thereby successively closing contacts $39^x$, $41^x$, $43^x$, and $45^x$. Closing $39^x$ opens contact $52^x$, thus opening the shunt circuit across the busses $50^x$, $51^x$, which was previously closed through shunt resistance $53^x$; then resistance sections $46^x$, $47^x$ and $48^x$ from which the circuit is completed through the armature busses $50^x$, $51^x$. In addition to these main armature resistance sections 46$^x$, 47$^x$, and 48$^x$, controlling all armatures, there are also the above referred to individual resistances 58$^x$ in each armature circuit, adapted to control the tension of the wire between the units upon changes in speed.

When once set for any given size and character of wire, these resistances 58$^x$ are rarely changed. A compound field winding 60$^y$ is controlled by the shunt variable resistance 60$^z$, which is rarely varied during a run of any given material but is used for different materials or different numbers or sizes of steel wool being cut.

The shunt fields 60$^x$ of all the traction wheel motors are controlled by the main field rheostat 10$^x$, which is between the line and the shunt field busses 8$^x$, 9$^x$, thus giving control of all the shunt fields as a unit while the individual (vernier) field rheostats 60$^z$ give separate independent control for the series field winding 60$^x$ of each motor.

When for any reason the wheels are to be stopped, the switch 27$^x$ is opened thereby successively opening the switches at 45$^x$, 43$^x$, 41$^x$ and 39$^x$, cutting in resistances 48$^x$, 47$^x$, 46$^x$ and causing the other end of the lever of switch 39$^x$ to close contact 52$^x$ across the armature busses, 50$^x$, 51$^x$, whereupon all motors run as generators with fields separately excited with their armatures in parallel across the resistance 53$^x$, thus causing each motor to act as a dynamic brake for each wheel. In this way all of the units of the machine are stopped uniformly and in the shortest possible time.

It will be understood that when any cutter fails to function properly, the operator merely pushes the entire holder back and secures it by bolt 103 engaging behind detent 103$^a$, until the blade can be replaced. When the end of the wire approaches and while a new coil of wire is being welded to it, or when supply and drawing reels are being interchanged, there is a period of idleness during which all of the cutters on one traction wheel may be changed by removing the tool frame and inserting a new one. In actual practice, however, it has been found that the operator has ample time to make all necessary changes and adjustments of the blades while the machine is running. In a particular instance, a single wheel, 60 cutter machine required only 3 replacements in four hours.

One advantage of the arrangement shown in Figs. 1 and 2 is that the coarser fibers or shavings such as are taken off by knives having, say, 30 serrations per inch, will always be taken off by knives at the feed-in end of the machine, while the successively finer grades, produced by knives having finer serrations, say, 54, 80, 100, 133, etc., up to 240 per inch, will also be taken off at other definite points further on in the machine.

In Figs. 14 and 15, I have shown a single unit machine which from the industrial viewpoint may be considered as the initial installation from which a complete machine shown in Figs. 1 and 2 may be developed. This single unit machine as made and used by me involves the equivalent of everything heretofore described in connection with the multiple unit machine and also the system of wiring thereof. The only differences result from the fact that as shown herein the traction wheel or disc 13 and the knives used thereon are only wide enough to accommodate six turns of the wire and of diameter only sufficient to accommodate 60 knives as a maximum. Consequently, this machine will not operate to reduce wire of ordinary commercial sizes down to scrapping thinness by one pass through the machine. Consequently, transferable winding and supply reels are used, the supply reel being subject to dynamic brake effect of a motor 3$^z$ connected with the reel 2$^z$ through a gear 4$^z$ in precisely the same relation that motor 3 and gear 4 has to the straightening rolls 2 of Figs. 1 to 5.

Analogously, the traction reel 2$^y$ at the other end of the machine is driven by motor 3$^y$ through gear 4$^y$ in like manner as the traction rolls, 2$^a$, 5$^a$ are driven by motor 3$^a$ and gear 4$^a$ of said Figs. 1 to 5.

The single unit wheel 13 is driven through gears in box 19 by motor 15 just as in the complete machine. Furthermore the braking motor 3$^z$ for the supply reel and the driving motor for the traction reel and the motor 15 for the wheel are connected up in a system precisely as shown in the wiring diagram, Fig. 13; except, of course, that there being only one unit, only one unit motor wiring is employed, that is to say, there is only one field circuit, 65$^x$, 66$^x$, 60$^x$, 67$^x$, and there is only one armature circuit 58$^x$, 115$^a$, 60$^z$ and contacts 31$^x$ and 32$^x$, with the circuits and switches which they control, are omitted. The unit itself may be precisely the same, the only difference in the showing of Figs. 14 and 15 being in the position of the main guide wheel which, as actually used by me, was displaced to the right of the meridian plane of the wheel, as shown, so as to be more accessible and to allow slightly greater vertical distance between it and the bottom of the wheel 13.

The reels may be of any known or desired construction, provided they are of the type adapted for transverse traverse to lay and feed off the wire in constant alignment with the exit pass of the machine and are adapted for automatic reverse operation to similarly feed off the wire into the entrance pass of the machine. This makes it possible to shift a full drawing reel to supply reel position and the empty supply reel to the drawing reel position. As the reels may be very heavy and contain many miles of wire, an overhead crane may be used for this purpose. It will be found convenient also to stop the machine just before the supply reel is exhausted, cut off the wire, transfer the reels and weld the free end of the wire on the full reel to the rear end of the wire remaining in the machine. This saves loss of time which would be otherwise required to rethread the wire through the machine.

Operated as above, this single unit machine has produced in eight hours over 600 lbs. of the finest size steel wool, known as .000. It may be noted also that it is used with perfect success for cutting wool from many other metals, including such extremely soft metals as copper, which have been found extremely difficult if not impossible to use on the old types of standard steel wool machines.

I claim:

1. A machine for making metal wool from wire, including a plurality of grooving machine units each having a cutting bed and a set of knives along the periphery of the bed in operative relation thereto, said machine units being arranged in series for simultaneous operation on successive portions of the same wire, and guides intermediate the cutting beds adapted to loop the wire successively around the beds to maintain single direction curvature of the wire throughout the entire cutting operation.

2. A machine for making metal wool from wire, including a plurality of grooving machine units each having a cutting bed and a set of knives along the periphery of the bed in operative relation thereto, said machine units being arranged in series for simultaneous operation on successive portions of the same wire, and means for guiding and setting the wire in loops curving continuously in the same direction successively around the cutting beds.

3. A machine for making metal wool from wire, including a plurality of grooving machine units each having a set of grooving knives in operative relation to a longitudinally grooved, convex cutting bed, said machine units being arranged in series for simultaneous operation on successive portions of the same wire, with means for guiding and setting the wire in successive loops curving continuously in the same direction successively under, then back over each cutting bed from the far side thereof.

4. A machine for making metal wool from wire, including a plurality of grooving machine units each having a set of grooving knives in operative relation to a longitudinally grooved, convex cutting bed, said machine units being arranged in series for simultaneous operation on successive portions of the same wire, with guides intermediate the cutting beds adapted to maintain single direction curvature of the wire throughout the entire cutting operation, in combination with means for applying traction to the wire at a plurality of points intermediate the ends of the machine.

5. A machine for making metal wool from wire, including a plurality of grooving machine units each having a cutting bed and a set of knives along the periphery of the bed in operative relation thereto, said machine units being arranged in series for simultaneous operation on successive portions of the same wire, guides intermediate the cutting beds adapted to loop the wire successively around the beds to maintain single direction curvature of the wire throughout the entire cutting operation, and means for applying end traction at the end of the machine.

6. A machine for making metal wool from wire, including a plurality of grooving machine units each having a set of grooving knives in operative relation to a longitudinally convex cutting bed, said machine units being arranged in series for simultaneous operation on successive portions of the same wire, with guides intermediate the cutting bed adapted to maintain single direction curvature of the wire throughout the entire cutting operation, in combination with means for applying traction to the wire at a plurality of points intermediate the ends of the machine and means for applying end traction at the end of the machine.

7. A machine for making metal shavings from wire, including a longitudinally grooved convex cutting bed for supporting the wire and a plurality of floating grooving knives spaced along said bed, in combination with guiding means in advance of the entrance of the machine to give the wire a set in a plane curve approximating the longitudinal curvature of the bed grooves.

8. A machine for making metal shavings from wire, including a longitudinally grooved convex cutting bed for supporting the wire and a plurality of floating grooving knives spaced along said bed, in combination with guiding means in advance of the entrance of the machine to give the wire a set in a plane curve approximating the longitudinal curvature of the bed grooves and means for maintaining end traction on said wire.

9. A machine for making metal shavings from wire, including a longitudinally grooved convex cutting bed for supporting the wire and a plurality of floating grooving knives spaced along said bed, in combination with entrance guides including a roller adapted to set the wire in a plane curve in a single direction approximately the same as the bed grooves.

10. A machine for making metal shavings from wire, including a rotor having a true circle grooved periphery affording a cutting bed for supporting the wire and a plurality of grooving knives spaced along said periphery, in combination with guiding means in advance of the entrance of the machine to give the wire a set in a plane curve approximating the curvature of the grooved periphery.

11. A machine for making metal shavings from wire, including a rotor having a true circle grooved periphery affording a cutting bed for supporting the wire and a plurality of grooving knives spaced along said periphery, in combination with entrance guides including a roller adapted to set the wire in a plane curve in a single direction approximately the same as the peripheral bed grooves.

12. A machine for making metal shavings from wire including a rotor having a true circle grooved periphery affording a cutting bed for supporting the wire and a plurality of grooving knives spaced along said periphery, in combination with entrance guides including a roller adapted to set the wire in a plane curve in a single direction, approximately the same as the peripheral bed grooves and means for applying end traction on said wire and means tending to rotate said rotor.

13. A machine for making metal shavings from wire, including a plurality of grooving units each having a set of grooving knives in operative relation to a peripherally grooved rotor affording a rotating, convex cutting bed for the wire, said units being arranged in series for simultaneous operation on successive portions of the same wire with guides intermediate the rotary cutting beds adapted to maintain single direction curvature of the wire during and between all the cutting operations.

14. A machine for making metal shavings from wire, including a plurality of grooving units each having a set of grooving knives in operative relation to a peripherally grooved rotor affording a rotating, convex cutting bed for the wire, said units being arranged in series for simultaneous operation on successive portions of the same wire, with means for guiding and setting the wire in successive loops curving continuously in the same direction between and over the cutting beds.

15. A machine for making metal shavings from wire, including a plurality of grooving units each having a set of grooving knives in operative relation to a peripherally grooved rotor affording a rotating, convex cutting bed for the wire, said units being arranged in series for simultaneous operation on successive portions of the same wire, with means for guiding and setting the wire in successive loops curving continuously in the same direction, and extending forward under, then back over each rotary cutting bed from the far side thereof.

16. A machine for making metal shavings from wire, including a plurality of grooving units each having a set of grooving knives in operative relation to a peripherally grooved rotor affording a rotating, convex cutting bed for the wire, said units being arranged in series for simultaneous operation on successive portions of the same wire, with guides intermediate the rotary cutting beds adapted to maintain single direction curvature of the wire throughout the entire cutting operation, in combination with motor means for rotating said rotors in the same direction at approximately the same rate.

17. A machine for making metal shavings from wire, including a plurality of grooving units each having a set of grooving knives in operative relation to a peripherally grooved rotor affording a rotating, convex cutting bed for the wire, said units being arranged in series for simultaneous operation on successive portions of the same wire, with guides intermediate the rotary cutting beds adapted to maintain single direction curvature of the wire throughout the entire cutting operation, and means for applying end traction at the end of the machine.

18. A machine for making metal shavings from wire, including a plurality of grooving units each having a set of grooving knives in operative relation to a peripherally grooved rotor affording a rotating, convex cutting bed for the wire, said units being arranged in series for simultaneous operation on successive portions of the same wire with guides intermediate the rotary cutting beds adapted to maintain single direction curvature of the wire during and between all the cutting operations and means in advance of the entrance of each groove to give the wire a set in a plane curve approximating the longitudinal curvature of the bed grooves.

19. A machine for making metal shavings from wire, including a plurality of grooving units each having a set of grooving knives in operative relation to a peripherally grooved rotor affording a rotating, convex cutting bed for the wire, said units being arranged in series for simultaneous operation on successive portions of the same wire with guides intermediate the rotary cutting beds adapted to maintain single direction curvature of the wire during and between all the cutting operations and means in advance of the entrance of each groove to give the wire a set in a plane curve approximating the longitudinal curvature of the bed grooves, and means for maintaining end traction on the wire.

20. A machine for making metal shavings from wire, including a plurality of grooving units each having a set of grooving knives in operative relation to a peripherally grooved rotor affording a rotating, convex cutting bed for the wire, said units being arranged in series for simultaneous operation on successive portions of the same wire with guides intermediate the rotary cutting beds adapted to maintain single direction curvature of the wire during and between all the cutting operations, in combination with guiding means in advance of the entrance of each groove to give the wire a set in a plane curve approximating the longitudinal curvature of the bed grooves and means for maintaining end traction on said wire.

21. A machine for making metal shavings from wire, including a plurality of grooving units each having a set of grooving knives in operative relation to a peripherally grooved rotor affording a rotating, convex cutting bed for the wire, said units being arranged in series for simultaneous operation on successive portions of the same wire, in combination with entrance guides including a roller in advance of each groove adapted to set the wire in a plane curve in a single direction approximately the same as the bed grooves.

22. A machine for making metal shavings from wire, including a rotor having its periphery formed with a plurality of circumferential grooves, in parallel planes, at right angles to the axis of the rotor, affording a plurality of parallel cutting beds carrying the wire and a set of grooving knives spaced along said periphery in operative relation to a plurality of said grooves, in combination with means for deflecting and guiding the wire in a practically one-direction curve, into and out of successive grooves.

23. A machine for making metal shavings from wire, including a rotor having the periphery formed with a plurality of circumferential grooves, in parallel planes, at right angles to the axis of the rotor, affording a plurality of parallel cutting beds carrying the wire and a set of grooving knives spaced along said periphery in operative relation to a plurality of said grooves, in combination with means for deflecting and guiding the wire in a practically one-direction curve, into and out of successive grooves, including means in advance of each groove for setting the wire to approximately fit the circumferential curvature of said groove before entry thereof.

24. A machine for making metal shavings from wire, including a rotor having its periphery formed with a plurality of circumferential grooves, in parallel planes, at right angles to the axis of the rotor, affording a plurality of parallel cutting beds carrying the wire, means for deflecting and guiding the wire in practically one-direction curves, into and out of successive grooves, in combination with a set of grooving knives spaced along said periphery each extending across and simultaneously shaving the turns of wire in all said grooves.

25. A machine for making metal shavings from wire, including a rotor having its periphery formed with a plurality of circumferential grooves, in parallel planes, at right angles to the axis of the rotor, affording a plurality of parallel cutting beds carrying the wire, means for deflecting and guiding the wire in practically one-direction curves, into and out of successive grooves, including means in advance of each groove for setting the wire to approximately fit the circumferential curvature of each groove, before entry thereof, in combination with a set of grooving knives spaced along said periphery each extending across and simultaneously shaving the turns of wire in all said grooves.

26. A machine for making metal shavings from wire, including a plurality of rotors in approximately the same plane and driven in the same direction, each rotor having its periphery formed with a plurality of circumferential grooves, in parallel planes, at right angles to the axis of the rotor, affording a plurality of parallel cutting beds carrying adjacent turns of the same wire, and a set of grooving knives spaced along said periphery, each extending across and simultaneously shaving the turns of wire in all said grooves, in combination with means for deflecting and guiding the wire in one-direction curves, into and out of successive grooves and from the last groove of one rotor to the first groove of the next rotor.

27. A machine for making metal shavings from wire, including a plurality of rotors in approximately the same plane and driven in the same direction, each rotor having its periphery formed with a plurality of circumferential grooves, in parallel planes, at right angles to the axis of the rotor, affording a plurality of parallel cutting beds carrying adjacent turns of the same wire and a set of grooving knives spaced along said periphery, each extending across and simultaneously shaving the turns of wire in all said grooves, in combination with means for deflecting and guiding the wire in one-direction curves, into and out of successive grooves and from the last groove of one rotor to the first groove of the next rotor, including means in advance of each groove for setting the wire to approximately fit the circumferential curvature of each groove, before entry thereof.

28. A machine for making metal shavings from wire, including a motor driven rotor having its periphery formed with a plurality of circumferential grooves, in parallel planes, at right angles to the axis of the rotor, affording a plurality of parallel cutting beds carrying the wire, means for deflecting and guiding the wire in practically one-direction curves, into and out of successive grooves, including means in advance of each groove for setting the wire to approximately fit the circumferential curvature of each groove, before entry thereof, and a set of grooving knives spaced along said periphery each knife extending across and simultaneously shaving the turns of wire in all said grooves, in combination with means for tensioning the wire in the machine, including separate motor driven means for applying end traction on wire passing from the machine and means including an electric generator driven by the wire as it passes into the machine.

29. A machine for making metal shavings from wire, including a plurality of rotors in approximately the same plane and driven in the same direction by a separate motor, each rotor having its periphery formed with a plurality of circumferential grooves, in parallel planes, at right angles to the axis of the rotor, affording a plurality of parallel cutting beds carrying adjacent turns of the same wire, a set of grooving knives spaced along said periphery, each knife extending across and simultaneously shaving the turns of wire in all said grooves, and means for deflecting and guiding the wire in one-direction curves, into and out of successive grooves and from the last groove of one rotor to the first groove of the next rotor, in combination with means for tensioning the wire in the machine including separate motor driven means for applying end traction on wire passing from the machine and means including an electric generator driven by the wire as it passes into the machine.

30. A machine for grooving fibers from metal, including means for supporting and feeding the metal, a knife having a grooved under surface and bevelled to form a serrated cutting edge, a knife-holding clamp presenting the grooved face of the knife toward the metal at acute cutting angles, in combination with an oil reservoir and a conduit supplying oil to the grooved face of the knife through the clamping face contacting therewith.

31. A machine for grooving fibers from metal, including means for supporting and feeding the metal, a knife blade having a grooved under surface and bevelled to form a serrated cutting edge and a pivotally mounted knife-holder presenting the serrations of the knife to the metal at acute cutting angles affording a lifting reaction on the serrations the amount of which depends upon depth of the cut, and weighted lever means for applying uniform pressure opposing such reactions non-positively to permit balanced, self-gaging action of the cutting edge at a desired depth less than the depth of the serrations, in combination with an oil reservoir and a conduit supplying oil to the grooved face of the knife through the clamping face contacting therewith.

32. A machine for grooving fibers from metal, including means for supporting and feeding the metal, a knife blade having a grooved under surface and bevelled to form a serrated cutting edge and a pivotally mounted knife-holder having a blade clamping arm extending parallel with the pivotal axis and a transverse clamp at the end thereof, presenting the grooved face of the knife toward the metal at acute cutting angles, in combination with an oil reservoir and a conduit supplying oil to the grooved face of the knife through the clamping face contacting therewith.

33. A machine for shaving metal wool from wire, including means for supporting and feeding the wire, a cutter blade having a grooved face and bevelled to form a serrated cutting edge and a knife-holder presenting the grooved face of the blade toward the metal at acute cutting angles and means for applying an air blast along the cutting edge, in combination with an oil reservoir and a conduit supplying oil to the grooved face of the knife through the clamping face contacting therewith.

34. The method of making metal wool from wire, which includes progressively feeding and straightening the wire, setting it in a uniform, single-plane, arc of a circle, passing it in a plurality of turns around the periphery of a rotary bed approximately of the same plane and curvature as the set of the wire, and shaving the convex side of all the turns of the wire along a surface parallel with the axis of the rotary bed.

35. The method of making metal wool from wire, which includes progressively feeding and straightening the wire, setting it in a uniform, single-plane, arc of a circle, passing it around the periphery of a rotary bed approximately of the same plane and curvature as the set of the wire, shaving the convex side of the wire along a surface parallel with the axis of the rotary bed; resetting the partially straightened wire to the same curvature while maintaining it in the same plane as before and again shaving as before.

36. The method of reducing wire to metal wool by continuously progressing passes of the wire over successive convex cutter beds having a multiplicity of grooving knives, which method includes progressively setting the wire in a series of loops of continuous single direction curvature in a single plane, the upper, reverse-moving parts of which loops have their outer surfaces engaged by the knives and their inner surfaces engaged by the cutter beds.

37. The method specified by claim 36, with the further feature of resetting the wire to the original curvature after each passage under the knives.

38. The method specified by claim 36, with the further feature of maintaining the decreased set due to the action of the knives throughout the long arc curves of the loops from the exit of one cutting bed to the entrance of the next cutting bed; and there resetting the wire to the original curvature prior to its passage over the latter bed.

Signed at New York, in the county of New York and State of New York, this 27th day of August, A. D. 1925.

CROSBY FIELD.